Feb. 23, 1932. F. A. CALKINS 1,846,990
ATTACHABLE CHAIN LINK
Filed March 26, 1931
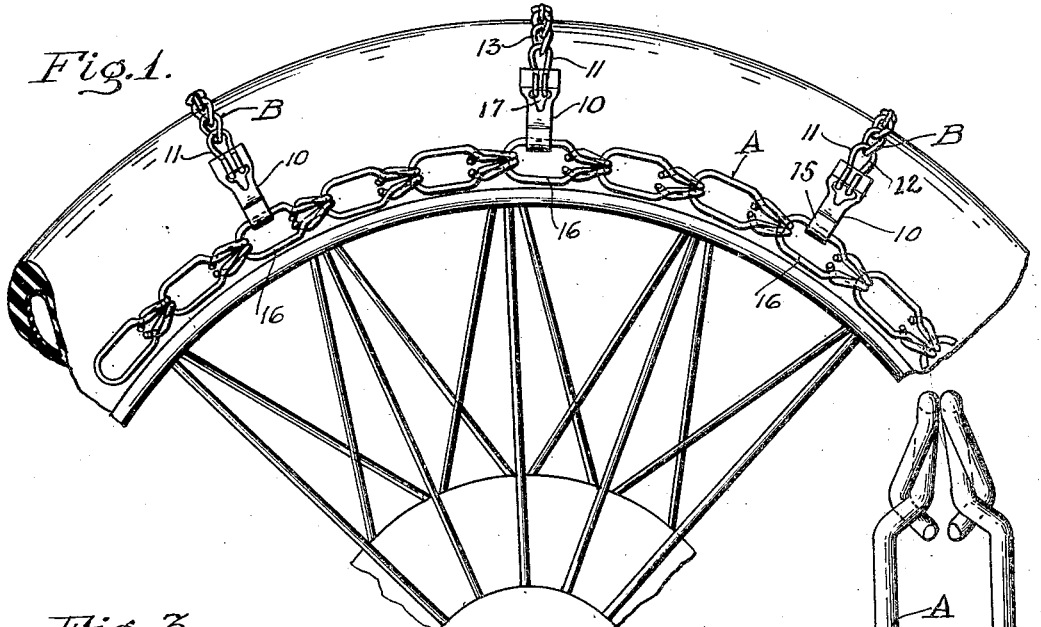
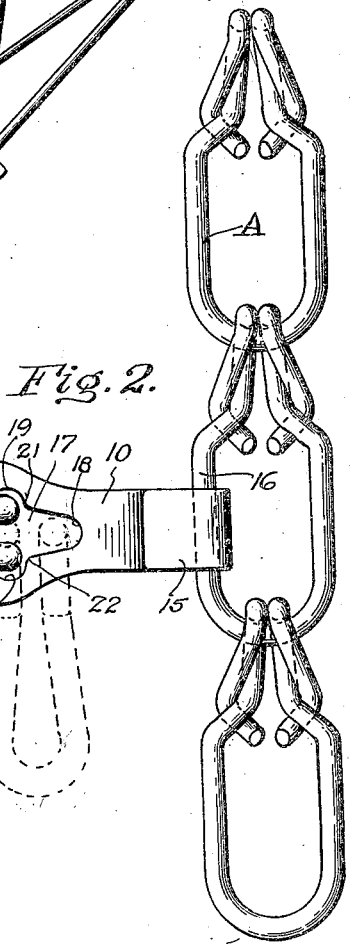
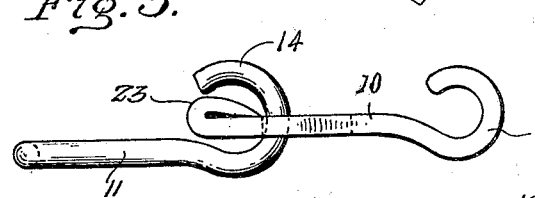
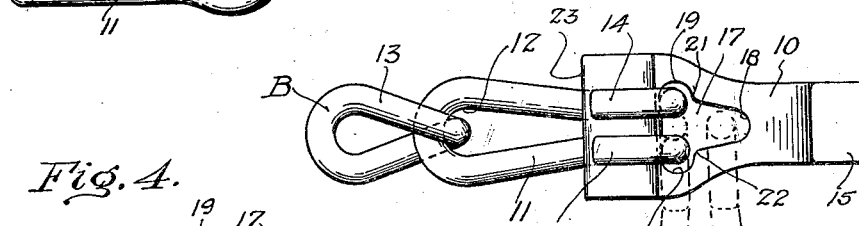
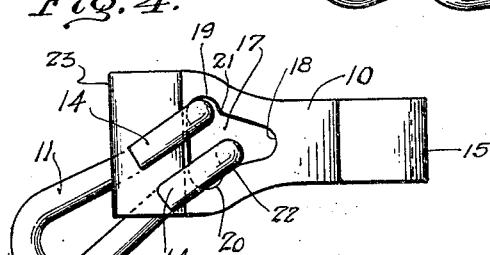
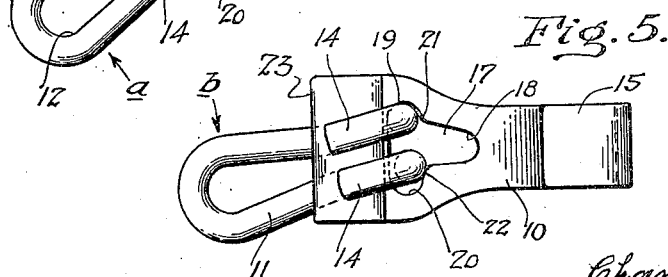
INVENTOR.
Frederick A. Calkins
BY
Chamberlain & Newman
ATTORNEYS.

Patented Feb. 23, 1932

1,846,990

UNITED STATES PATENT OFFICE

FREDERICK A. CALKINS, OF WATERBURY, CONNECTICUT

ATTACHABLE CHAIN LINK

Application filed March 26, 1931. Serial No. 525,429.

My invention relates to improvements in connectable link means for chains and more particularly to anti-skid chain devices, for vehicle tires, and comprising side chains and attached cross or tread chain.

It is well known that the various chain sections used in the above forms of anti-skid devices do not wear equally, and that the so-called cross chains wear out very readily and much quicker than the side chains, because of the rough usage to which they are subjected. It is therefore the general practice with these present commercial forms of chains, to detach the entire anti-skid chain device and to employ special tools with which to remove the broken sections of cross chains and to replace them with new ones, whereby the anti-skid chain may again be attached to the tire.

The intermediate links of these cross chains are the ones that receive the severest wear while the end links of these cross chains, notably those disposed against the side of the tire and connected to the side chains, receive comparatively little wear. This being so, it will be readily appreciated that my present novel link means, that is adapted for attachment to the side chains, will likewise not be subject to very much wear. This also applies to the wire hook members forming the ends of the cross chains and adapted for detachable connection with my improved link means. The side chains to be used in connection with my invention may be like that shown in the drawings or like practically any of the commercial forms of chains used in anti-skid chain devices. This is also equally true of the cross chains with the exception of my improved link means and the associated hook for use in connection therewith. The twisted form of link, as shown in the drawings of this application, are very generally used for the cross chains, yet it is to be understood that the particular form of this link, as well as the side chains, is not material to the successful operation of my invention.

It is the purpose of my present invention to provide a special form of link means that may be permanently attached to links of the side chains, at proper and equal distances apart, and to which the cross chains may be detachably connected without the removal of the side chains from the wheel, and so that said cross chains or broken sections thereof may be readily unhooked from my novel link means carried by the side chains and whereby new cross chains of proper lengths and having hooks on opposite ends may be quickly and conveniently attached.

With these and other objects in view, the invention resides and consists in the construction and novel combination and arrangement of parts hereinafter more fully described, illustrated in the accompanying drawings, and pointed out in the claims hereto appended, it being understood that various changes in the form, proportion, size, and minor details of construction within the scope of the claims may be resorted to without departure from the spirit, or sacrificing any of the advantages of the invention.

Similar characters of reference denote like or corresponding parts throughout the several figures of the accompanying drawings forming a part of this specification and upon which Fig. 1 shows a side elevation of a portion of an automobile wheel on a reduced scale, having a section of an anti-skid chain device, including my invention applied thereto;

Fig. 2 shows a full-sized plan view of a portion of a side chain and cross chain, connected by my novel link means;

Fig. 3 is a side elevation of the connectable link and hook shown in Fig. 2;

Fig. 4 shows a plan view of the connectable links, partly assembled, in position to be snapped into place; and Fig. 5 is a similar plan view of the two associated links in position to be snapped out of place for disconnecting.

Referring in detail to the characters of reference marked upon the drawings, A represents a side chain member of a commercial form of anti-skid chain which includes two side chains and a series of cross chains B. The links of both of these side chains may be of any desired form, size and proportion, though in practice a straight form of link, as herein shown, is usually employed, while a twisted form of link is generally used in the cross chains. In practice these anti-skid chains are made up and assembled as in one piece and include suitable means not herein shown for connecting the ends of the side chains together, as in applying the anti-skid device.

My invention relates more particularly to an attachable link as herein shown and to which the hooks of the cross chains are detachably connected. My novel form of link means includes a special form of link 10 which is preferably made of sheet metal, as herein shown, and is so constructed and arranged as to allow of the attachment of a special form of wire hook 11 forming the end members of the cross chains B and whereby the said cross chains may be detachably connected as is necessary in the removal of broken chains and the replacement thereof with new ones. This form of hook will readily be understood from Figs. 2 to 5 inclusive and, as will be seen, includes a loop portion 12 that is connected in the loop of the end links 13 of the cross chain B, and has its two end portions disposed forward in spaced parallel relation, and bent back to form the two hook ends 14—14.

The flat metal link 10 includes a relative narrow attachable end portion 15 which is originally made in the form of a hook, see Fig. 3, and closed down upon and for permanent connection to one side portion of a link 16 of the side chain A when it is desired to connect the two. The outer end portion of this flat link 10 is made relatively wide and is provided with an opening 17 therethrough to receive the wire end portions 14 of the hook 11, as in the attachment of the same to the link 10. The opening is substantially of a tri-angular shape and includes three corners or pockets 18, 19 and 20 arranged in tri-angular relation. The first mentioned pocket is positioned central of the width of the link and the two latter at either side of a central line through the link. This opening further includes inwardly disposed shoulders 21 and 22, one between the pockets 18 and 19 upon the one side, and the other between the pockets 18 and 20. The large end of the link adjacent the opening may be thickened, as at 23, if desired, to provide additional wearing qualities to the link.

The particular formation of the opening including the rectangularly positioned pockets and the intervening shoulders is important for the successful operation of my invention in that it permits the hook to be attached or detached by hand and without the assistance of tools of any sort, and to be held in such attached positions. This will be better understood with reference to Figs. 2, 4 and 5 of the drawings wherein it will be seen that for the attachment of the hook to the flat metal link it is necessary to first position the hook at a right angle to the link and to insert the hook ends through the opening longitudinally in the manner indicated in dotted lines in Fig. 2, and then to shove the hook 11 well up into the pocket 19, as shown in Fig. 4, whereupon further pressure upon the loop of the hook in the direction of the arrow indicated by "a" will tend to spring the two hook end portions of the hook together in a way to allow them to snap by the shoulder 22 and to be brought into alignment with the flat metal link. When in this position, it is impossible for the two members to become disconnected unless manual strain is brought to bear along lines reversed from that indicated in Fig. 4.

The detachment of the hook from the flat metal link will readily be understood from reference to Fig. 5 wherein it will be seen that one of the legs of the hook have been shoved into one of the side pockets of the opening, and the other leg of the hook is positioned against the shoulder 22 so that with slight additional pressure applied to the loop portion of the hook in the direction indicated by arrow "b", the two legs of the hook are moved inward, permitting that one which is in engagement with the shoulder to snap by and allow the hook to again be positioned at a right angle to and detached from the flat metal link.

My links can perhaps most advantageously be used by applying them to the side chains in the original manufacture of the anti-skid chain, whereupon replacement of cross chains can be readily effected by simply discarding the short ends of the broken chains, whereas if it is to be used originally as a repair proposition to present day standard types of anti-skid chains, it would be necessary to disconnect the broken ends of the cross chains and to substitute therefor one of my flat metal hooks upon opposite portions of the side chains and then to connect the two hook ends of the cross chains to the flat metal link in the manner heretofore described. After the flat metal links have once been applied to the side chains the removal and attachment of the cross chains are comparatively easy and inexpensive. In this connection it will also be borne in mind that shorter cross chains may be used with my improved link means than would be possible if no such link were employed, since in that case, the end links or hooks used for connection to the side chains would necessarily have to be thrown away along with the rest of the sections of the broken cross chains.

Having thus described my invention, what I claim and desire to secure by Letters Patent is:

1. An attachable chain link including an attachable end portion and an enlarged end for the attachment of a hook having a tri-angular shaped opening therethrough including pockets in its three corners and a shoulder formed between two or more of said pockets, and a wire hook member including a loop and yieldable spaced-apart hook end portions adapted to be inserted in the opening of the link and then compressed and swung into alignment therewith.

2. An attachable link including an attachable end portion and an enlarged end for the attachment of a hook having a tri-angular shaped opening therethrough including pockets in its three corners and a shoulder formed between two or more of said pockets and a thickened portion between the opening and end of link, and a wire hook member including a loop and yieldable spaced-apart hook end portions adapted to be inserted in the opening of the link and then compressed and swung into alignment therewith.

3. The combination of a link of the class described comprising an attachable end portion and an end for the attachment of a hook including a substantially tri-angular shaped opening having a central end pocket and oppositely positioned side pockets with a shoulder formed between said central pocket and each of the side pockets, and a wire hook member including a loop and yieldably spaced-apart hook end portions adapted to be inserted in the opening of the link when at a right angle thereto and then to be swung in alignment therewith against the resistance of one of the said shoulders by applying pressure to the loop sufficient to spring the yieldable ends of the hook together and snap it by one of the before mentioned shoulders.

Signed at Waterbury, in the county of New Haven and State of Connecticut this 24th day of March, A. D. 1931.

FREDERICK A. CALKINS.